United States Patent
Hsiang (10) Patent No.: US 10,523,966 B2
(45) Date of Patent: Dec. 31, 2019

(54) CODING TRANSFORM BLOCKS

(71) Applicant: MediaTek Inc., Hsinchu (TW)

(72) Inventor: Shih-Ta Hsiang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 15/939,980

(22) Filed: Mar. 29, 2018

(65) Prior Publication Data

US 2018/0288437 A1 Oct. 4, 2018

Related U.S. Application Data

(60) Provisional application No. 62/479,352, filed on Mar. 31, 2017.

(51) Int. Cl.
| | |
|---|---|
| H04N 19/60 | (2014.01) |
| H04N 19/176 | (2014.01) |
| H04N 19/186 | (2014.01) |
| H04N 19/13 | (2014.01) |
| H04N 19/96 | (2014.01) |
| H04N 19/463 | (2014.01) |

(52) U.S. Cl.
CPC ............ *H04N 19/60* (2014.11); *H04N 19/13* (2014.11); *H04N 19/176* (2014.11); *H04N 19/186* (2014.11); *H04N 19/463* (2014.11); *H04N 19/96* (2014.11)

(58) Field of Classification Search
CPC ..... H04N 19/60; H04N 19/176; H04N 19/186
See application file for complete search history.

(56) References Cited

U.S. PATENT DOCUMENTS

| | | | | |
|---|---|---|---|---|
| 2011/0249721 | A1* | 10/2011 | Karczewicz ......... | H04N 19/159 375/240.02 |
| 2012/0106649 | A1* | 5/2012 | Wang ................... | H04N 19/159 375/240.18 |
| 2013/0188731 | A1* | 7/2013 | Kim ....................... | H04N 19/70 375/240.18 |
| 2013/0223518 | A1 | 8/2013 | Shibahara et al. | |
| 2016/0100175 | A1 | 4/2016 | Laroche et al. | |
| 2016/0277748 | A1* | 9/2016 | Lim ..................... | H04N 19/176 |

FOREIGN PATENT DOCUMENTS

CN          103765885 A          4/2014

OTHER PUBLICATIONS

State Intellectual Property Office, International Search Report and Written Opinion for International Patent Application No. PCT/CN2018/081360, dated May 30, 2018.
Li, Bin et al., A unified design of RQT cbf coding in I.CEC Joint Collaborative Team on Video Coding (JCT-VC) of ITU-T SG16 WP3 and ISO/IEC JTC1/SC29/WG11 4th Meeting, Daegu, South Korea, Jan. 28, 2011.

* cited by examiner

*Primary Examiner* — Tsion B Owens
(74) *Attorney, Agent, or Firm* — Han IP PLLC; Andy M. Han (57) ABSTRACT

A method for coding the coded block flags of individual transform blocks in a video coding system is provided. The method improves coding efficiency by jointly signaling the CBF values of Cb transform blocks and Cr transform blocks from a transform unit or coding unit. A single syntax element cbf_chroma is used to jointly code the CBF values of a pair of the collocated Cb and Cr transform blocks from a transform unit.

20 Claims, 8 Drawing Sheets

CODING TRANSFORM BLOCKS

CROSS REFERENCE TO RELATED PATENT APPLICATION(S)

The present disclosure is part of a non-provisional application that claims the priority benefit of U.S. Provisional Patent Application No. 62/479,352, filed on 31 Mar. 2017. Contents of above-listed applications are herein incorporated by reference.

TECHNICAL FIELD

The present disclosure relates generally to video coding. In particular, the present disclosure relates to signaling presence or absence of non-zero transform coefficients in a transform block region.

BACKGROUND

Unless otherwise indicated herein, approaches described in this section are not prior art to the claims listed below and are not admitted as prior art by inclusion in this section.

High-efficiency video coding (HEVC) is the latest video coding standard developed by the Joint Collaborative Team on Video Coding (JCT-VC). In HEVC, a coded picture is represented by a plurality of coded slices. Each slice is partitioned into non-overlapped coding tree units (CTUs). The size of a CTU is specified by a syntax element in the sequence parameter set (SPS) and ranges from 16×16 to 64×64 in the main profile. A CTU can be further partitioned into one or multiple coding units (CUs) to adapt to varying local statistical characteristics. Each CU can be further divided into one or multiple prediction units (PUs). The PU works as a basic functional unit for predicting sample values in a block region. After obtaining the residual block by a prediction process, a CU can be further partitioned by a residual quadtree structure into one or multiple transform units (TUs). The TU is a basic block for applying transform and quantization operation for representing the prediction residual signal from a picture block region. A TU can consist of multiple transform blocks (TBs), corresponding to different color components from a TU block region.

Joint Video Exploration Team (JVET) of ITU-T SG 16 WP 3 and ISO/IEC JTC 1/SC 29/WG 11 is currently conducting research on the next-generation international video coding standard. In Joint Exploration Test Model 5 (JEM5), a quadtree plus binary tree (QTBT) structure is utilized for partitioning a CTU into one or multiple CUs. Each CU contains only one PU and one TU. The resulting TB dimension can range from 128×128 to 2×2 and can take a square or rectangular shape. In an I-slice, each CTU can be partitioned into two separate coding trees for one luma component (Y) and two chroma components (Cr and Cb), respectively.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for coding the coded block flags of individual transform blocks in a video coding system that improves coding efficiency by jointly signaling the CBF values of Cb transform blocks and Cr transform blocks from a transform unit or coding unit. In some embodiments, a single syntax element cbf_chroma is used to jointly code the CBF values of a pair of the collocated Cb and Cr transform blocks from a transform unit.

In some embodiments, an encoder or a decoder receives a block of pixels comprising a luma component, a first chroma component, and a second chroma component. The block of pixels is encoded as transform coefficients. The encoder or decoder codes first and second flags as a code word. The first flag indicates a presence of a non-zero transform coefficient for the first chroma component and the second flag indicates a presence of a non-zero transform coefficient for the second chroma component. The code word has different lengths for different combinations of values of the first and second flags. The encoder or decoder then codes the block of pixels for transmission or display by using the first and second flags.

In some embodiments, the code word is encoded by using truncated unary code. The first flag is a one-bit value and the second flag is a one-bit value, and a shortest length for the code word has no more than one bit. The shortest length for the code word represents absence of any non-zero transform coefficients for both the first and second chroma component. The second shortest length for the code word may represents presence of non-zero transform coefficients for both the first and second chroma component. The second shortest length for the code word may represent presence of at least one non-zero transform coefficient for the first chroma component and absence of any non-zero transform coefficients for the second chroma component.

In some embodiments, the different lengths of the code word are mapped to different combinations of values of the first and second flags according to a look up table (LUT). The LUT is selected from among a plurality of LUTs based on a selection value that is encoded as part of a sequence parameter set (SPS), a picture parameter set (PPS), or a slice segment header of a bitstream that encodes the block of pixels. In some embodiments, when a root coded block flag for the block of pixels is zero, the first flag and the second flag are inferred to be zero and the code word is not encoded.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

In a video stream, a coded block flag (CBF) is for indicating if there are any non-zero transform coefficients in a transform block region. When a CBF is equal to 1, the associated transform block contains at least one non-zero coefficient. Otherwise, the associated transform block is not further coded and all of its coefficients are inferred to be equal to 0. In HEVC, the syntax elements cbf_luma, cbf_cb, and cbf_cr are employed to derive the CBFs of the transform blocks from luma, Cb, and Cr components, respectively. A root coded block flag syntax element root_cbf (also referred to as rqt_root_cbf) is further utilized in an inter prediction CU to compactly indicate if any of CBFs of transform blocks in the associated CU is nonzero. When root_cbf is equal to 0, all CBFs of transform blocks in the associated CU are not coded and inferred to be equal to 0.

Some embodiments of the disclosure provide a method for coding (i.e., encoding and/or decoding) the coded block flags of individual transform blocks in a video coding system that improves coding efficiency by jointly signaling the CBF values of Cb transform blocks and Cr transform blocks from a transform unit or coding unit. In some embodiments, a single syntax element cbf_chroma is used to jointly code the CBF values of a pair of the collocated Cb and Cr transform blocks from a transform unit.

In some embodiments, the four possible combinations of the CBF values of the two coded chroma blocks are uniquely identified by a variable cbfCbCr that is defined as ((cbfCb<<1)+cbfCr), where cbfCb (i.e., the value of the cbf_cb flag) and cbfCr (i.e., the value of the cbf_cr flag) are binary variables for the CBF values of the Cb transform block and the Cr transform block, respectively. (The variable cbfCbCr can therefore have a syntax value equal to 0, 1, 2, or 3.) In some embodiments, the variable cbfCbCr is binarized as the syntax element cbf_chroma based on truncated unary code with a maximum code word value equal to 3. For example, when cbfCbCr=0, cbf_chroma is '0'; when cbfCbCr=3, cbf_chroma is '10'; when cbfCbCr=2, cbf_chroma is '110'; when cbfCbCr=1, cbf_chroma is '111'.

Figure 1:
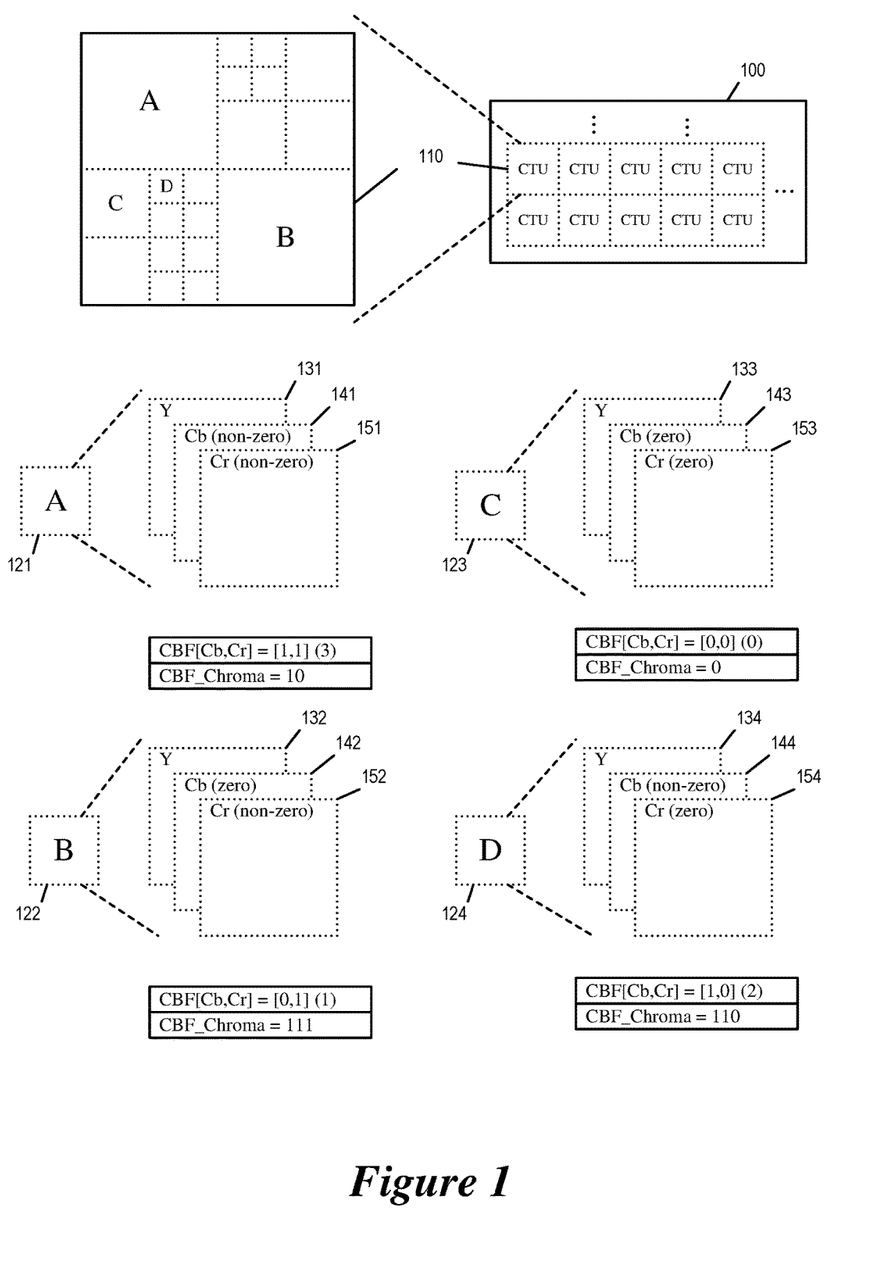
FIG. 1 conceptually illustrates the joint signaling of the CBF values of Cb transform blocks and Cr transform blocks.

FIG. 1 conceptually illustrates the joint signaling of the CBF values of Cb transform blocks and Cr transform blocks. The figure illustrates a video picture 100 whose pixels have a luma component and two chroma components (Cr and Cb).

The video picture is coded as coding tree units (CTUs), including a CTU 110. The CTU 110 is sub-divided into coding units (CUs), each CU codes a block of pixels in the video picture. Each CU may be further divided into child CUs. Each CU may include one or more transform units (TUs) that each contains transform coefficients for a block of pixels in the video picture. Each TU may be further divided into child TUs.

As illustrated, the CTU 110 is sub-divided into blocks of pixels in a quad tree manner. Each block of pixels, including blocks 121-124 that are respectively labeled A, B, C, and D, corresponds to a TU. Some of these TUs are leaf level TUs that do not further sub-divide.

The pixels that fall within a TU are encoded as transform coefficients. The three color components of the pixels are encoded as respective corresponding sets of transform coefficients for those components (Y, Cb, and Cr). As illustrated, each of the TUs 121-124 includes a set of transform coefficients for Y (luma component), a set of transform coefficients for Cb (first chroma component), and a set of transform coefficients for Cr (second chroma component). A set of transform coefficients for a luma or chroma component is also referred to as a transform block (TB). As illustrated, the TU 121 (block A) includes TB 131 for Y, TB 141 for Cb, TB 151 for Cr; the TU 122 (block B) includes TB 132 for Y, TB 142 for Cb, TB 152 for Cr; the TU 123 (block C) includes TB 133 for Y, TB 143 for Cb, TB 153 for Cr; and the TU 124 (block D) includes TB 134 for Y, TB 144 for Cb, TB 154 for Cr.

For each TU, cbf_cb and cbf_cr flags indicates whether the TU's Cb component TB and Cr component TB have non-zero transform coefficients. In the example, cbf_cb of A, cbf_cr of A, cbf_cr of B, cbf_cb of D are set to '1' to indicate their corresponding transform blocks (TBs 141, 151, 152, 144, respectively) have non-zero coefficients. On the other hand, cbf_cb of B, cbf_cb of C, cbf_cr of C, and cbf_cr of D are set to '0' to indicate their corresponding transform blocks (TBs 142, 143, 153, 154, respectively) do not have non-zero coefficients (i.e., have only zero coefficients or not coded).

Instead of separately signaling cbf_cb and cbf_cr for each TU, the cbf_cb flag and the cbf_cr flag are encoded together as a truncated unary code word for the syntax element cbf_chroma for each TU. The code word has different lengths for different combinations of values of the cbf_cb and cbf_cr flags (i.e., different values of the variable cbfCbCr). In the example, the values of the cbf_cb and cbf_cr flags for TU A are [1,1], the code word of its corresponding syntax element cbf_chroma is '10'. The values of the cbf_cb and cbf_cr flags for TU B are [0,1], the code word of its corresponding syntax element cbf_chroma is '111'. The values of the cbf_cb and cbf_cr flags for TU C are [0,0], the code word of its corresponding syntax element cbf_chroma is '0'. The values of the cbf_cb and cbf_cr flags for TU D are [1,0], the code word of its corresponding syntax element cbf_chroma is '110'.

Whenever the shortest code word (e.g., '0') for the syntax element cbf_chroma is used to represent the combination of cbf_cb and cbf_cr flags, the bit rate is reduced because one bit is used to represent two flags that are at least one-bit each. Consequently, in some embodiments, the mapping scheme between the different combinations of cbf_cb and cbf_cr flags and the different length code words is chosen such that more likely combinations of cbf_cb and cbf_cr are assigned shorter code words (e.g., '0' and '10') while less likely combinations of cbf_cb and cbf_cr are assigned longer code words (e.g., '110' and '111').

In some embodiments, a flexible mapping selection scheme is used such that, for each TU, a lookup table (LUT) is selected from a set of LUTs to determine the assignment of code words to different combinations of cbf_cb and cbf_cr flags (e.g., different values of the variable cbfCbCr). An example set of look-up tables are provided in Tables 1 and 2.

TABLE 1 mapping cbfCbCr to cbf_chroma

| i (or cbfCbCr) | 0 | 1 | 2 | 3 |
|---|---|---|---|---|
| cbfCbCrEnc[0][i] | 0 | 1 | 2 | 3 |
| cbfCbCrEnc[1][i] | 0 | 2 | 1 | 3 |
| cbfCbCrEnc[2][i] | 0 | 3 | 2 | 1 |
| cbfCbCrEnc[3][i] | 1 | 3 | 2 | 0 |
| cbfCbCrEnc[4][i] | 3 | 2 | 1 | 0 |
| cbfCbCrEnc[5][i] | 3 | 1 | 2 | 0 |

Table 1 contains a set of forward LUTs cbfCbCrEnc[0:5]. An index k selects one of the LUTs cbfCbCrEnc[0:5]. The selected LUT (cbfCbCrEnc[k]) maps each possible value of the index i (variable cbfCbCr) to a corresponding index by cbfCbCrEnc[k][i]. The four possible indices of cbfCbCrEnc[k][i] (0, 1, 2, 3) are then respectively mapped to truncated unary code words ('0', 10', '110', '111') for the syntax element cbf_chroma. For example, if k=2 and the LUT cbfCbCrEnc[2] is selected:

cbfCbCr=0 is mapped to cbf_chroma=0 (code word '0'),
cbfCbCr=1 is mapped to cbf_chroma=3 (code word '111'),
cbfCbCr=2 is mapped to cbf_chroma=2 (code word '110'),
cbfCbCr=3 is mapped to cbf_chroma=1 (code word '10').

When using this particular LUT, the shortest length code word ('0') represents the absence of any non-zero transform coefficients for both chroma components (cfb_cb and cfb_cr are both 0). The second shortest length code word ('10') represents presence of non-zero transform coefficients for both chroma components (cfb_cb and cfb_cr=are both 1).

As a further example, if the LUT cbfCbCrEnc[1] is selected:

cbfCbCr=0 is mapped to cbf_chroma=0 (code word '0');
cbfCbCr=1 is mapped to cbf_chroma=2 (code word '110');
cbfCbCr=2 is mapped to cbf_chroma=1 (code word '10');
cbfCbCr=3 is mapped to cbf_chroma=3 (code word '111').

In this case, the shortest length code word ('0') represents the absence of any non-zero transform coefficients for both chroma components (cfb_cb and cfb_cr are both 0). The longest length code word ('111') represents the presence of non-zero transform coefficients for both chroma components (cfb_cb and cfb_cr are both 1). The second and third shortest lengths ('10' and '110') for the code word represents presence of non-zero transform coefficient in only one of the two chroma components. ([cbf_cb, cbf_cr]=[0,1] or [1,0]).

Table 2 contains a corresponding set of inverse look-up tables cbfCbCrDec[0:5]. An index k selects one of the LUTs cbfCbCrDec[0:5]. The selected LUT (cbfCbCrDec[k]) maps an index j back to the cbfCbCr variable value such that the decoder may obtain cfb_cb and cfb_cr flags. The four possible values of the index j (0, 1, 2, 3) corresponds to the four possible code words of cbf_chroma ('0', '10', '110', '111').

TABLE 2 mapping cbf_chroma to cbfCbCr

| j (or cbf_chroma) | 0 | 1 | 2 | 3 |
|---|---|---|---|---|
| cbfCbCrDec[0][j] | 0 | 1 | 2 | 3 |
| cbfCbCrDec[1][j] | 0 | 2 | 1 | 3 |
| cbfCbCrDec[2][j] | 0 | 3 | 2 | 1 |
| cbfCbCrDec[3][j] | 3 | 0 | 2 | 1 |
| cbfCbCrDec[4][j] | 3 | 2 | 1 | 0 |
| cbfCbCrDec[5][j] | 3 | 1 | 2 | 0 |

For example, if LUT cbfCbCrDec[2] is selected:

j=0 (cbf_chroma code word '0') is mapped to cbfCbCr=0;
j=1 (cbf_chroma code word '10') is mapped to cbfCbCr=3;
j=2 (cbf_chroma code word '110') is mapped cbfCbCr=2;
j=3 (cbf_chroma code word '111') is mapped to cbfCbCr=1.

In some embodiments, when more than one LUT selection is available, one or more high-level syntax elements may be used to specify the selected LUT (e.g., to select one of cbfCbCrEnc[0:5] at the video encoder or to select one of cbfCbCrDec[0:5] at the video decoder). The high-level syntax elements can be present in the syntax structures of sequence parameter set (SPS or sequence header), picture parameter set (PPS or picture header), and/or slice segment header. In some embodiments, different LUTs are assigned for different slice types. In some embodiments, different LUTs are assigned for different CU prediction modes.

When a CU is partitioned into multiple TUs, the CBFs of the transform blocks from each chroma component may be jointly signaled by CBFs of their parent partitions. For example, HEVC codes the CBF of a residual quadtree node from a chroma component to indicate if any of the CBFs of its child quadtree nodes (all partitioned from the current quadtree node) is non-zero. In other words, the cbf_cb flag of a TU can be used to indicate if any of the CBFs for Cb TBs of the TU's child quadtree nodes is non-zero, and cbf_cr flag of a TU can be used to indicate if any of the CBFs for Cr TBs of the TU's child quadtree nodes is non-zero.

In some embodiments, the cbf_cb and cbf_cr flags corresponding to the same block region are jointly coded as one code word for the syntax element cbf_chroma. In other words, one cbf_chroma code word (in truncate unary) can be used to indicate if there is any non-zero CBF for Cb and Cr components in the current block partition, including any of its child quadtree nodes. In the example of FIG. 1, the code word "0" for cbf_chroma syntax element for TU 123 may indicate that all child quadtree nodes of TU 123 have zero CBF for both Cb and Cr components, while the code word "110" for the TU 124 may indicate that all child quadtree nodes of TU 124 have zero CBF for the Cr component while at least one child quadtree node has a non-zero CBF for the Cb component.

When transform blocks are comprised in a coding unit, a syntax element may be used to indicate if the associated coding unit contains any non-zero transform block. For example, JEM5 employs a syntax element root_cbf in an inter prediction CU to indicate if any of the CBFs of the three component transform blocks in the associated CU is nonzero. In some embodiments, when the syntax element root_cbf is set to 1 to indicate that not all transform blocks are zero, (i.e., the CBFs of included transform blocks are not all equal to 0), the CBFs of the two chroma transform blocks in the CU are jointly coded as one code word for the syntax element cbf_chroma. In other words, one cbf_chroma code word (in truncate unary) can be used to indicate if there is any non-zero CBF for Cb and Cr components in the current block partition when the CU is inter-prediction coded and root_cbf is set to 1.

Figure 2:
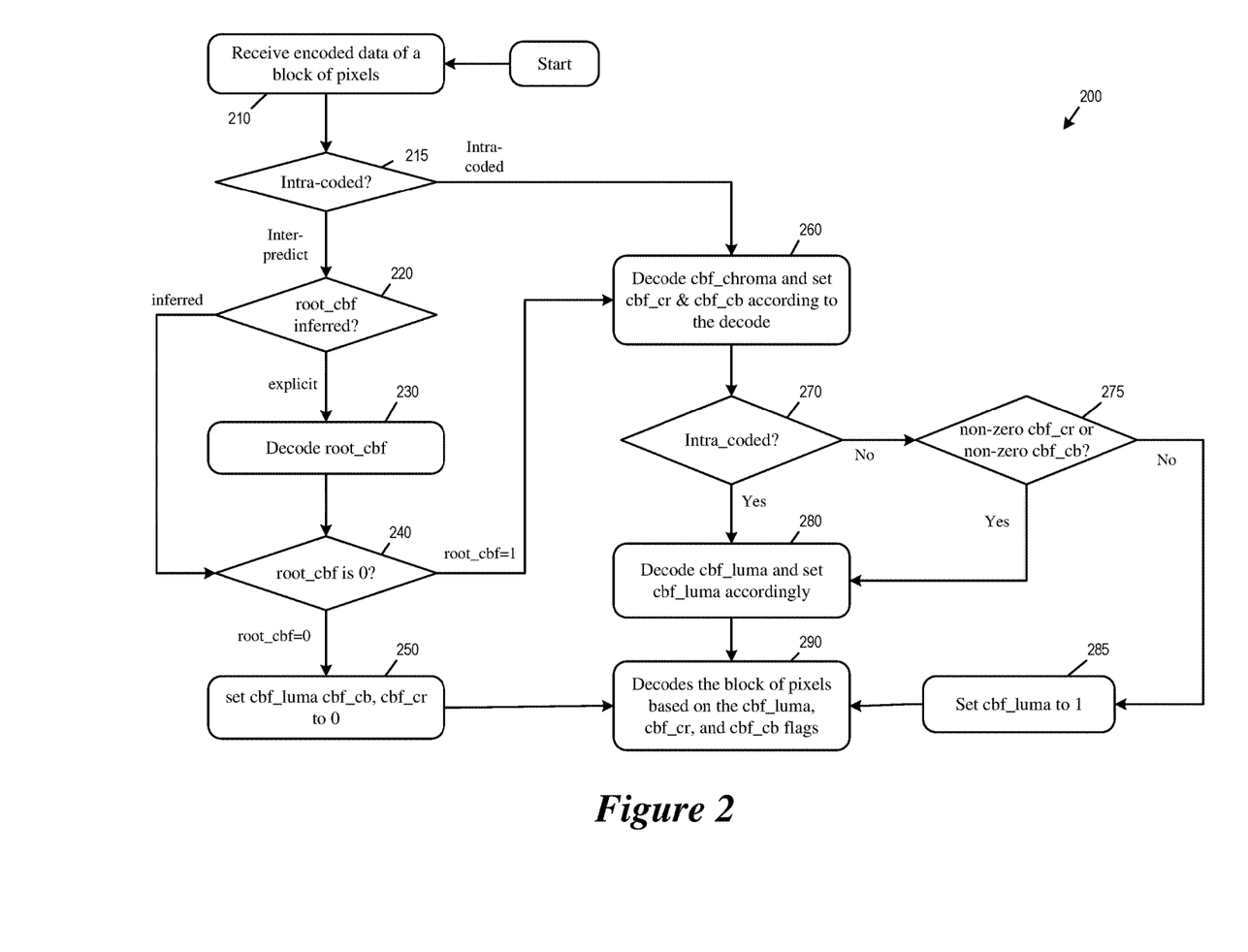
FIG. 2 conceptually illustrates a process for decoding a bitstream that uses one single syntax element to indicate non-zero transform blocks for both chroma components.

FIG. 2 conceptually illustrates a process 200 for decoding a bitstream that uses one single syntax element to indicate non-zero transform blocks for both chroma components. In some embodiments, one or more processing units (e.g., a processor) of a computing device implementing a video decoder perform the process 200 by executing instructions stored in a computer readable medium. In some embodiments, an electronic apparatus implementing a video decoder performs the process 200. An example video decoder 600 will be described by reference to FIG. 6 below.

In some embodiments, the video decoder performs the process 200 when it is decoding a block of pixels (e.g., a CU or a TU) from a bitstream for display. The decoder performing the process 200 determines whether TBs of both chroma components are non-zero based on the decoded syntax elements such as root_cbf and chroma_cbf.

The process 200 starts when the video decoder receives (at step 210) encoded data of a block of pixels in a video picture by parsing the bitstream. The encoded data of the block of pixels may include encoded transform coefficients for luma and chroma components of the block of pixels. The transform coefficients are arranged as transform blocks for each of the luma and chroma components.

The video decoder determines (at step 215) whether the current block of pixels is intra-coded or inter-prediction coded (by examining the bitstream). If the block is intra-coded, the process proceeds to 260. If the block is inter-prediction coded, the process proceeds to 220.

At step 220, the video decoder determines whether the root_cbf flag for the current block is inferred. For an inter-prediction coded block, the root_cbf flag is employed to indicate if any transform blocks in the associated CU is nonzero (e.g., whether any CBFs for the three component transform blocks in the associated CU is nonzero). When the root_cbf flag (or rqt_root_cbf) is not present for an inter-prediction coded block in the bitstream, its value is inferred (based on e.g., syntax elements, cu_skip_flag and merge_flag which constrains whether the residual signal shall be zero or non-zero for the current CU). If the root_cbf flag is inferred, the process proceeds to 240. If the root_cbf flag is not inferred but rather explicitly coded in the bitstream, the process proceeds to 230.

At step 230, the video decoder decodes or parses the root_cbf flag from the bitstream. The video decoder determines (at step 240) whether the root_cbf flag is zero. If the root_cbf flag is non-zero, the process proceeds to 260. If the root_cbf flag is zero, the process proceeds to 250 without parsing and decoding the cbf_chroma syntax element.

At step 250, the CBFs of all three components are inferred to be zero, and the video decoder sets cbf_luma, cbf_cb, and cbf_cr flags to be zero to indicate that the sets of transform coefficients (transform blocks) for all three components are zero. After setting the CBFs to zero, the process proceeds to 290.

At step 260, the video decoder decodes the cbf_chroma syntax element and sets cbf_cr and cbf_cb flags according to the decoded cbf_chroma syntax element. As mentioned, cbf_chroma is a single syntax element that encodes CBFs for both chroma (Cr and Cb) components. In some embodiments, the cbf_chroma is a truncated unary code word that has different lengths for different combinations of values of the cbf_cr and cbf_cb flags. Under the scheme, the shortest code word uses one bit to represent both cbf_cr and cbf_cb flags. At step 270, the video decoder determines whether the block of pixels is intra coded. If so, the process proceeds to 280. If the block of pixel is not intra coded, the process proceeds to 275.

The truncated unary coding of the cbf_chroma syntax element is described in further detail by reference to FIG. 1 above. The decoding of cbf_chroma may use a LUT, which maps code words of different lengths to different combinations of cbf_cb and cbf_cr flags. In some embodiments, the video decoder selects a LUT from a set of LUTs based on a higher-level selection syntax element in the bitstream. The use and selection of a LUT is described by reference to Table 1 and Table 2 above.

At step 275, the video decoder determines whether the cbf_cr flag or the cbf_cb flag is non-zero (i.e., whether cbf_chroma is non-zero). If at least one of the two chroma CBF flags is non-zero (indicating transform coefficients for Cr or Cb are non-zero), the process proceeds to 280. If both cbf_cr and cbf_cb flags are zero, the process proceeds to 285.

At step 280, the video decoder decodes or parses CBF for luma component and sets the cbf_luma flag accordingly. The process then proceeds to 290.

At step 285, the video decoder sets CBF for luma (cbf_luma flag) to 1 to indicate that transform block for luma is non-zero and has to be processed, since the video decoder at this step has already determined that the root_cbf is non-zero and both transform blocks for chroma components are zero, indicating the luma transform block is non-zero. The process then proceeds to 290.

At step 290, the video decoder decodes the block of pixels for display by using the decoded cbf_luma, cbf_cr, and cbf_cb flags. Specifically, the video decoder determines whether to perform or bypass inverse transform operations for transform blocks of luma, Cr, and Cb components based on the decoded cbf_luma, cbf_cr, and cbf_cb flags respectively. The process 200 then ends. In some other embodiments, steps in process 200 can be reordered or rearranged, which should not be limited in this disclosure.

Figure 3:
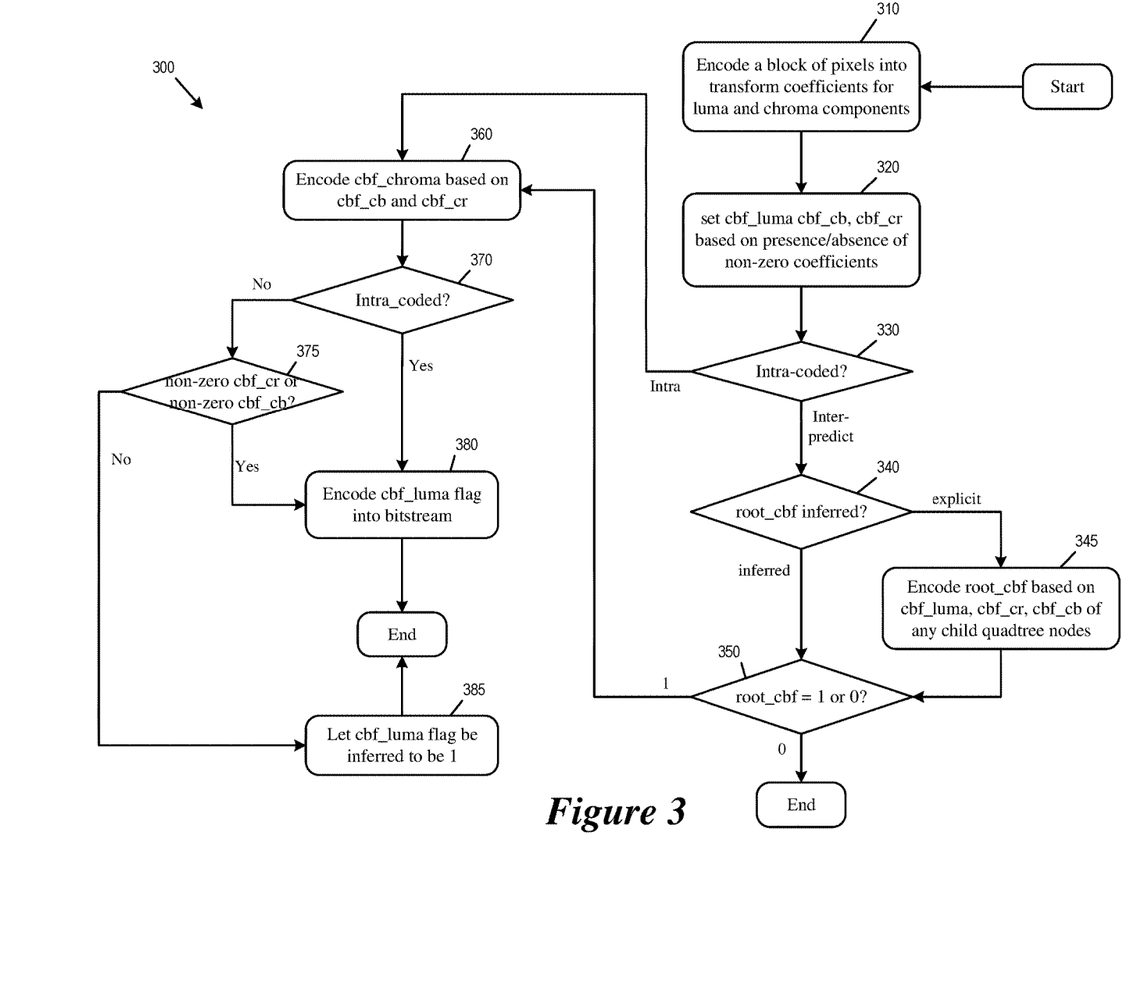
FIG. 3 conceptually illustrates a process for encoding a bitstream that uses one single syntax element to indicate non-zero transform blocks for both chroma components.

FIG. 3 conceptually illustrates a process 300 for encoding a bitstream that uses one single syntax element to indicate non-zero transform blocks for both chroma components. In some embodiments, one or more processing units (e.g., a processor) of a computing device implementing a video encoder perform the process 300 by executing instructions stored in a computer readable medium. In some embodiments, an electronic apparatus implementing a video encoder performs the process 300. An example video encoder 400 will be described by reference to FIG. 4 below.

In some embodiments, the video encoder performs the process 300 when it receives raw video pixel data for a video picture and encodes a block of pixels (e.g., a CU or a TU) of the video picture into a bitstream for storage or transmission. The encoder performing the process 300 signals whether TBs of both chroma components are non-zero based on the encoded syntax elements such as root_cbf and chroma_cbf.

The process 300 starts when the video encoder encodes (at step 310) the block of pixels into transform coefficients for the different color components (luma and chroma). The transform coefficients are arranged as transform blocks for each of the components.

The video encoder sets (at step 320) CBF flags for the luma and chroma components based on presence or absence of non-zero coefficients. A component whose transform coefficients are all zero has its corresponding CBF flag (cbf_luma, cbf_cr, or cbf_cb) set to zero. A component having non-zero transform coefficients has a non-zero corresponding CBF flag.

The video encoder determines (at step 330) whether the block of pixels is intra-coded. If so, the process proceeds to 360. If the block of pixels is inter-prediction coded, the process proceeds to 340.

At step 340, the video encoder determines whether root_cbf flag can be inferred such that root_cbf need not be explicitly signaled in the bitstream. If so, the process proceeds to 350. If the root_cbf flag cannot be inferred and has to be explicitly signaled, the process proceeds to 345.

At step 345, the video encoder encodes the root_cbf flag as a syntax element in the bitstream. The value of the root_cbf flag is based on the values of cbf_luma, cbf_cr, cbf_cb flags of child quadtree nodes. Specifically, if CBF flags of all components of all child quadtree nodes are zero, the video encoder would encode the root_cbf flag to be 0. Otherwise the video encoder would encode the root_cbf flag to be 1 to indicate the presence of non-zero transform coefficients. The process then proceeds to 350.

At step 350, the process determines whether root_cbf flag is 1 or 0, i.e., whether CBF flags of all components of all child quadtree nodes are zero. If root_cbf flag is 1 (there are non-zero transform blocks), the process proceeds to 360. If root_cbf flag is 0 (all transform blocks are zero or not coded), the process 300 ends without encoding the cbf_chroma syntax element so that the CBF flags of the Y, Cr, Cb components are inferred to be zero.

At step 360, the video encoder encodes the cbf_chroma code word as a syntax element in the bitstream. The value of cbf_chroma code word is based on the values of the CBF flags of the two chroma components (cbf_cb and cbf_cr flags). As mentioned, in some embodiments, the cbf_chroma is a truncated unary code word that has different lengths for different combinations of values of the cbf_cr and cbf_cb flags. The truncated unary coding of the cbf_chroma syntax element is described in further detail by reference to FIG. 1 above. The encoding of cbf_chroma may use a LUT, which maps code words of different lengths to different combinations of cbf_cb and cbf_cr flags. In some embodiments, the video encoder selects a LUT from a set of LUTs. The use and selection of a LUT is described by reference to Table 1 and Table 2 above. The video encoder also encodes a syntax element to indicate the selection of the LUT in the SPS, PPS, or slice segment header of the bitstream. The process then proceeds to 370.

At step 370, the video encoder determines whether the block of pixels is intra coded. If so, the process proceeds to 380. If the block of pixel is not intra coded, the process proceeds to 375.

At step 375, the video encoder determines whether the cbf_cr flag or the cbf_cb flag is non-zero. If at least one of the two chroma CBF flags is non-zero (indicating non-zero transform coefficients for Cr or Cb), the process proceeds to 380. If both cbf_cr and cbf_cb flags are zero, the process proceeds to 385.

At 380, the video encoder explicitly encodes the value of cbf_luma into the bitstream as a syntax element to indicate whether transform coefficients of the luma component is zero or non-zero. The process 300 then ends.

At 385, the video encoder bypasses encoding cbf_luma into the bitstream and lets the cbf_luma value be inferred to be 1 without explicit signaling in the bitstream. The process 300 then ends. In some other embodiments, steps in process 300 can be reordered or rearranged, which should not be limited in this disclosure.

Example Video Encoder

Figure 4:
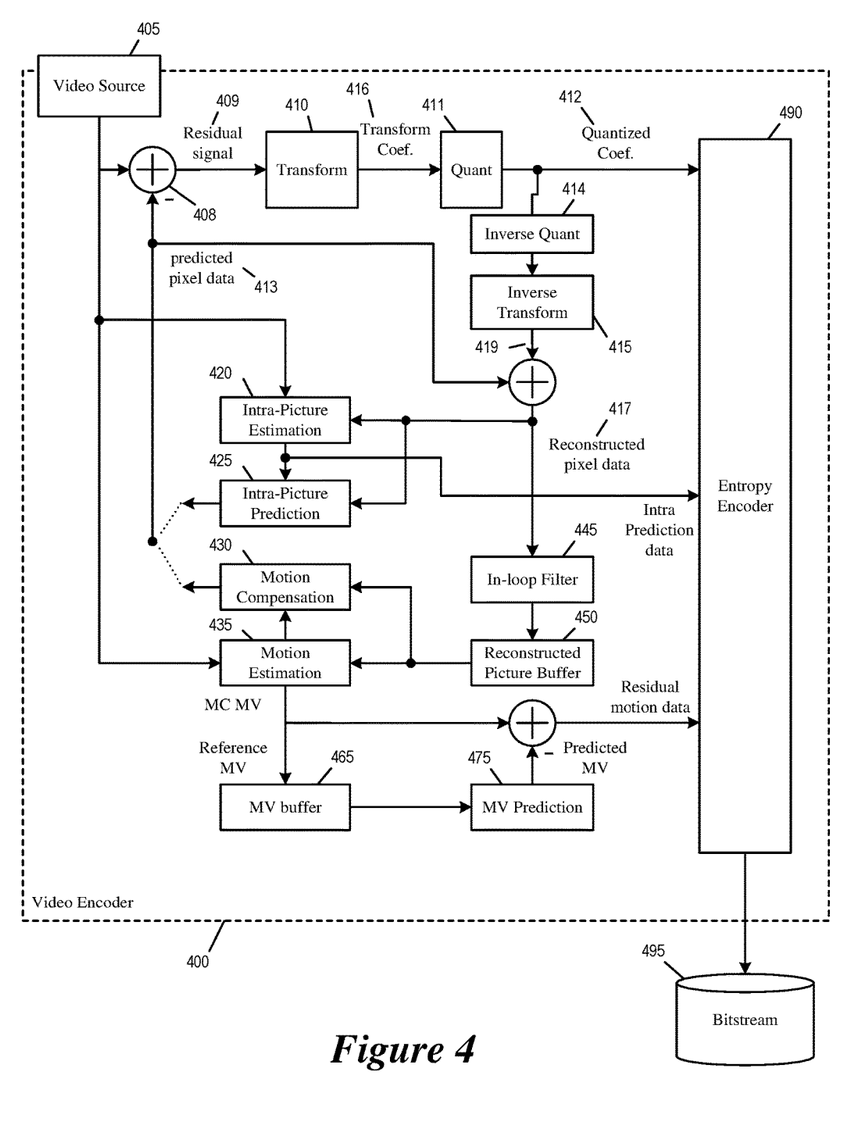
FIG. 4 illustrates an example video encoder consistent with an exemplary embodiment.

FIG. 4 illustrates an example video encoder 400 consistent with an exemplary embodiment. As illustrated, the video encoder 400 receives input video signal from a video source 405 and encodes the signal into bitstream 495. The video encoder 400 has several components or modules for encoding the video signal 405, including a transform module 410, a quantization module 411, an inverse quantization module 414, an inverse transform module 415, an intra-picture estimation module 420, an intra-picture prediction module 425, a motion compensation module 430, a motion estimation module 435, an in-loop filter 445, a reconstructed picture buffer 450, a MV buffer 465, and a MV prediction module 475, and an entropy encoder 490.

In some embodiments, the modules 410-490 are modules of software instructions being executed by one or more processing units (e.g., a processor) of a computing device or electronic apparatus. In some embodiments, the modules 410-490 are modules of hardware circuits implemented by one or more integrated circuits (ICs) of an electronic apparatus. Though the modules 410-490 are illustrated as being separate modules, some of the modules can be combined into a single module.

The video source 405 provides a raw video signal that presents pixel data of each video frame without compression. A subtractor 408 computes the difference between the raw video pixel data of the video source 405 and the predicted pixel data 413 from motion compensation 430 or intra-picture prediction 425. The transform 410 converts the difference (or the residual pixel data or residual signal 409) into transform coefficients (e.g., by performing Discrete Cosine Transform, or DCT). The quantizer 411 quantized the transform coefficients into quantized data (or quantized coefficients) 412, which is encoded into the bitstream 495 by the entropy encoder 490.

The inverse quantization module 414 de-quantizes the quantized data (or quantized coefficients) 412 to obtain transform coefficients, and the inverse transform module 415 performs inverse transform on the transform coefficients to produce reconstructed residual 419. The reconstructed residual 419 is added with the prediction pixel data 413 to produce reconstructed pixel data 417. In some embodiments, the reconstructed pixel data 417 is temporarily stored in a line buffer (not illustrated) for intra-picture prediction and spatial MV prediction. The reconstructed pixels are filtered by the in-loop filter 445 and stored in the reconstructed picture buffer 450. In some embodiments, the reconstructed picture buffer 450 is a storage external to the video encoder 400. In some embodiments, the reconstructed picture buffer 450 is a storage internal to the video encoder 400.

The intra-picture estimation module 420 performs intra-prediction based on the reconstructed pixel data 417 to produce intra prediction data. The intra-prediction data is provided to the entropy encoder 490 to be encoded into bitstream 495. The intra-prediction data is also used by the intra-picture prediction module 425 to produce the predicted pixel data 413.

The motion estimation module 435 performs inter-prediction by producing MVs to reference pixel data of previously decoded frames stored in the reconstructed picture buffer 450. These MVs are provided to the motion compensation module 430 to produce predicted pixel data. Instead of encoding the complete actual MVs in the bitstream, the video encoder 400 uses MV prediction to generate predicted MVs, and the difference between the MVs used for motion compensation and the predicted MVs is encoded as residual motion data and stored in the bitstream 495.

The MV prediction module 475 generates the predicted MVs based on reference MVs that were generated for encoding previously video frames, i.e., the motion compensation MVs that were used to perform motion compensation. The MV prediction module 475 retrieves reference MVs from previous video frames from the MV buffer 465. The video encoder 400 stores the MVs generated for the current video frame in the MV buffer 465 as reference MVs for generating predicted MVs.

The MV prediction module 475 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 495 by the entropy encoder 490.

The entropy encoder 490 encodes various parameters and data into the bitstream 495 by using entropy-coding techniques such as context-adaptive binary arithmetic coding (CABAC) or Huffman encoding. The entropy encoder 490 encodes parameters such as quantized transform data and residual motion data into the bitstream 495. The bitstream 495 is in turn stored in a storage device or transmitted to a decoder over a communications medium such as a network.

The in-loop filter 445 performs filtering or smoothing operations on the reconstructed pixel data 417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 5:
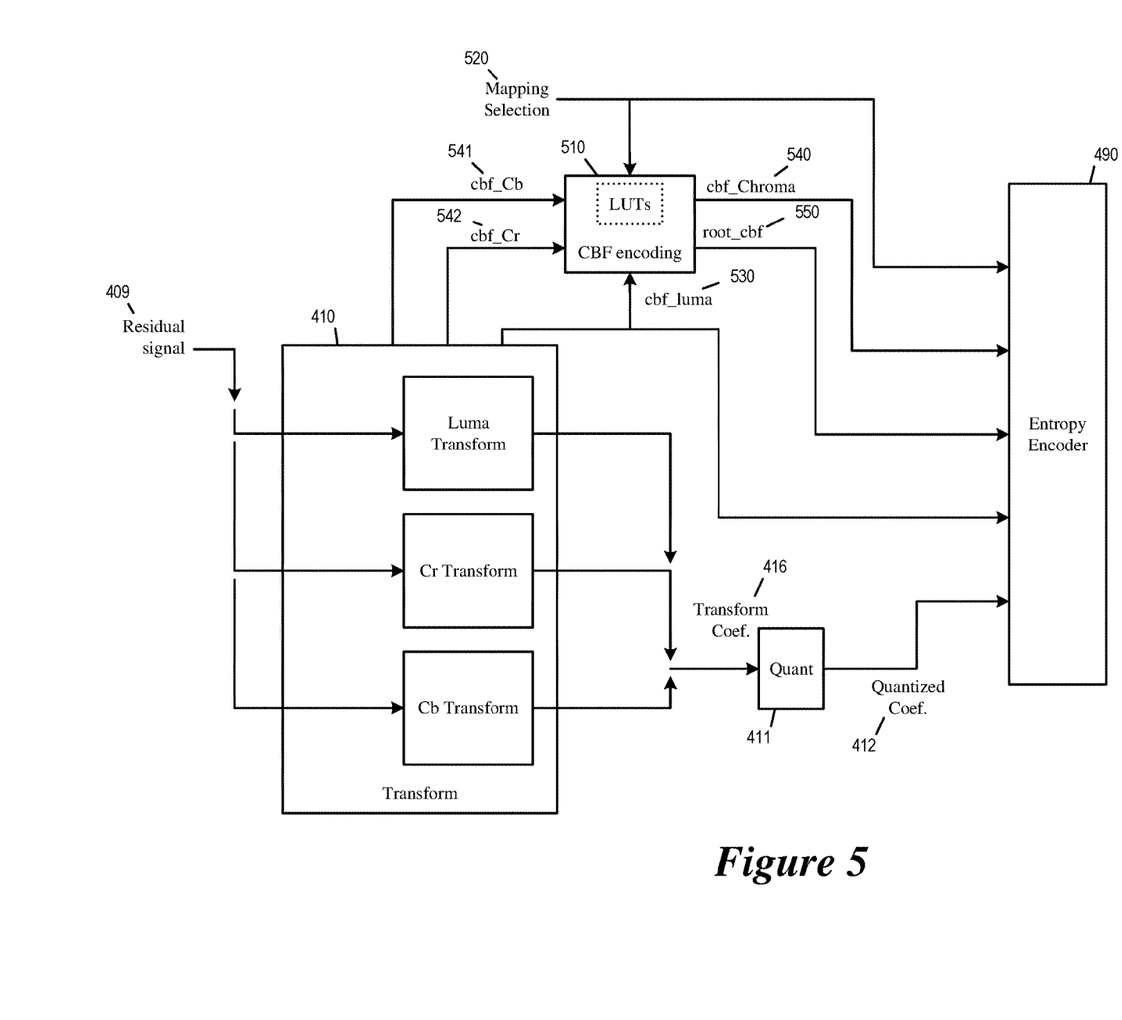
FIG. 5 illustrates parts of the video encoder that generates and uses CBF flags.

FIG. 5 illustrates parts of the video encoder 400 that generates and uses CBF flags. Specifically, the figure illustrates the portion of the video encoder 400 that generates the cbf_chroma syntax element based on cbf_cr and cbf_cb flags. As illustrated, the transform module 410 receives residual signal 409 for a current block of pixels. The transform module 400 transforms different components (Y, Cr, Cb) of the residual signal 409 into transform coefficients 416, which includes different sets of transform coefficients or transform blocks for the different components. The transform module 410 also produces cbf_luma flag 530 for the Y component, cbf_cb 541 for the Cb component, and cbf_cr 542 for the Cr component. The value of each component's CBF flag indicates whether the transforms module 410 produces non-zero transform coefficient for that component, or whether the transform module 410 performs transform operation for that component at all.

A CBF encoding module 510 receives the cbf_luma flag 530, the cbf_cb flag 541, and cbf_cr flags 542. Based on the received CBF flags, the CBF encoding module 510 generates the cbf_chroma syntax element 540 and/or the root_cbf syntax element 550. The CBF encoding module 510 also receives a mapping selection signal 520, which selects one of several possible LUTs (e.g., Table 1) for mapping the combination cbf_cr and cbf_cb into the cbf_chroma syntax element. In some embodiments, the video encoder 400 selects a LUT based on the slice type or the CU prediction mode of the current block. In some embodiments, the video encoder 400 selects a LUT that is most likely to reduce the length of the code word used for the cbf_chroma syntax element.

The CBF encoding module 510 may be part of the entropy encoder 490. In some embodiments, the CBF encoding module 510 generates the cbf_chroma syntax element 540 and root_cbf syntax element 550 by performing the process 300 described by reference to FIG. 3. The mapping selection signal 520, the cbf_chroma syntax element 540, the root_cbf syntax element 550, and the cbf_luma syntax element 530 are provided to the entropy encoder 490 to be included in the bitstream 495 along with quantized coefficients 412.

Example Video Decoder

Figure 6:
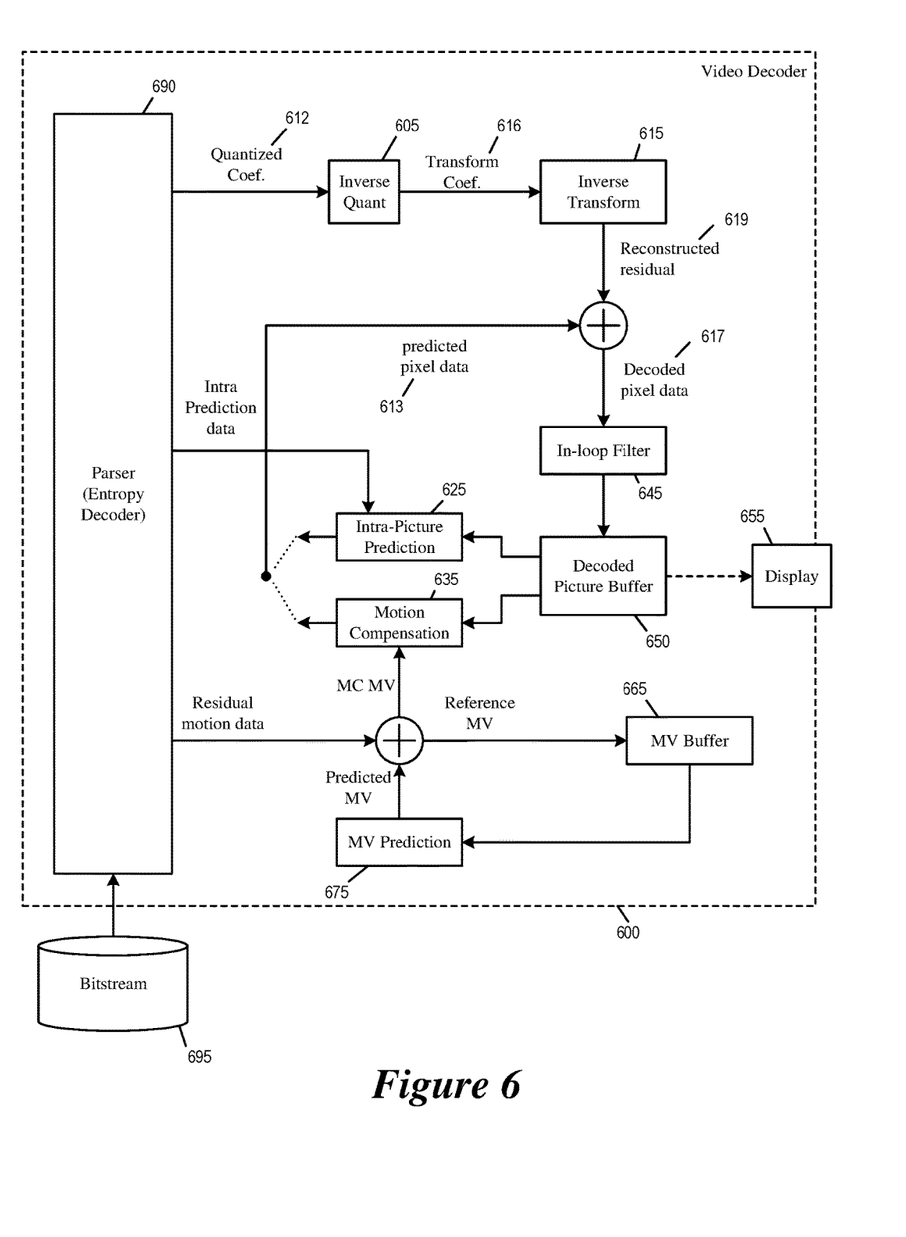
FIG. 6 illustrates an example video decoder, consistent with an exemplary embodiment.

FIG. 6 illustrates an example video decoder 600, consistent with an exemplary embodiment. As illustrated, the video decoder 600 is an image-decoding or video-decoding circuit that receives a bitstream 695 and decodes the content of the bitstream into pixel data of video frames for display. The video decoder 600 has several components or modules for decoding the bitstream 695, including an inverse quantization module 605, an inverse transform module 615, an intra-picture prediction module 625, a motion compensation module 635, an in-loop filter 645, a decoded picture buffer 650, a MV buffer 665, a MV prediction module 675, and a bitstream parser 690.

In some embodiments, the modules 610-690 are modules of software instructions being executed by one or more processing units (e.g., a processor) of a computing device. In some embodiments, the modules 610-690 are modules of hardware circuits implemented by one or more ICs of an electronic apparatus. Though the modules 610-690 are illustrated as being separate modules, some of the modules can be combined into a single module.

The parser 690 (or entropy decoder) receives the bitstream 695 and performs initial parsing according to the syntax defined by a video-coding or image-coding standard. The parsed syntax element includes various header elements, flags, as well as quantized data (or quantized coefficients) 612. The parser 690 parses out the various syntax elements by using entropy-coding techniques such as context-adaptive binary arithmetic coding (CABAC) or Huffman encoding.

The inverse quantization module 605 de-quantizes the quantized data (or quantized coefficients) 612 to obtain transform coefficients, and the inverse transform module 615 performs inverse transform on the transform coefficients 616 to produce reconstructed residual signal 619. The reconstructed residual signal 619 is added with prediction pixel data 613 from the intra-prediction module 625 or the motion compensation module 635 to produce decoded pixel data 617. The decoded pixels data are filtered by the in-loop filter 645 and stored in the decoded picture buffer 650. In some embodiments, the decoded picture buffer 650 is a storage external to the video decoder 600. In some embodiments, the decoded picture buffer 650 is a storage internal to the video decoder 600.

The intra-picture prediction module 625 receives intra-prediction data from bitstream 695 and according to which, produces the predicted pixel data 613 from the decoded pixel data 617 stored in the decoded picture buffer 650. In some embodiments, the decoded pixel data 617 is also stored in a line buffer (not illustrated) for intra-picture prediction and spatial MV prediction.

In some embodiments, the content of the decoded picture buffer 650 is used for display. A display device 655 either retrieves the content of the decoded picture buffer 650 for display directly, or retrieves the content of the decoded picture buffer to a display buffer. In some embodiments, the display device receives pixel values from the decoded picture buffer 650 through a pixel transport.

The motion compensation module 635 produces predicted pixel data 613 from the decoded pixel data 617 stored in the decoded picture buffer 650 according to motion compensation MVs (MC MVs). These motion compensation MVs are decoded by adding the residual motion data received from the bitstream 695 with predicted MVs received from the MV prediction module 675.

The MV prediction module 675 generates the predicted MVs based on reference MVs that were generated for decoding previous video frames, e.g., the motion compensation MVs that were used to perform motion compensation. The MV prediction module 675 retrieves the reference MVs of previous video frames from the MV buffer 665. The video decoder 600 stores the motion compensation MVs generated for decoding the current video frame in the MV buffer 665 as reference MVs for producing predicted MVs.

The in-loop filter 645 performs filtering or smoothing operations on the decoded pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
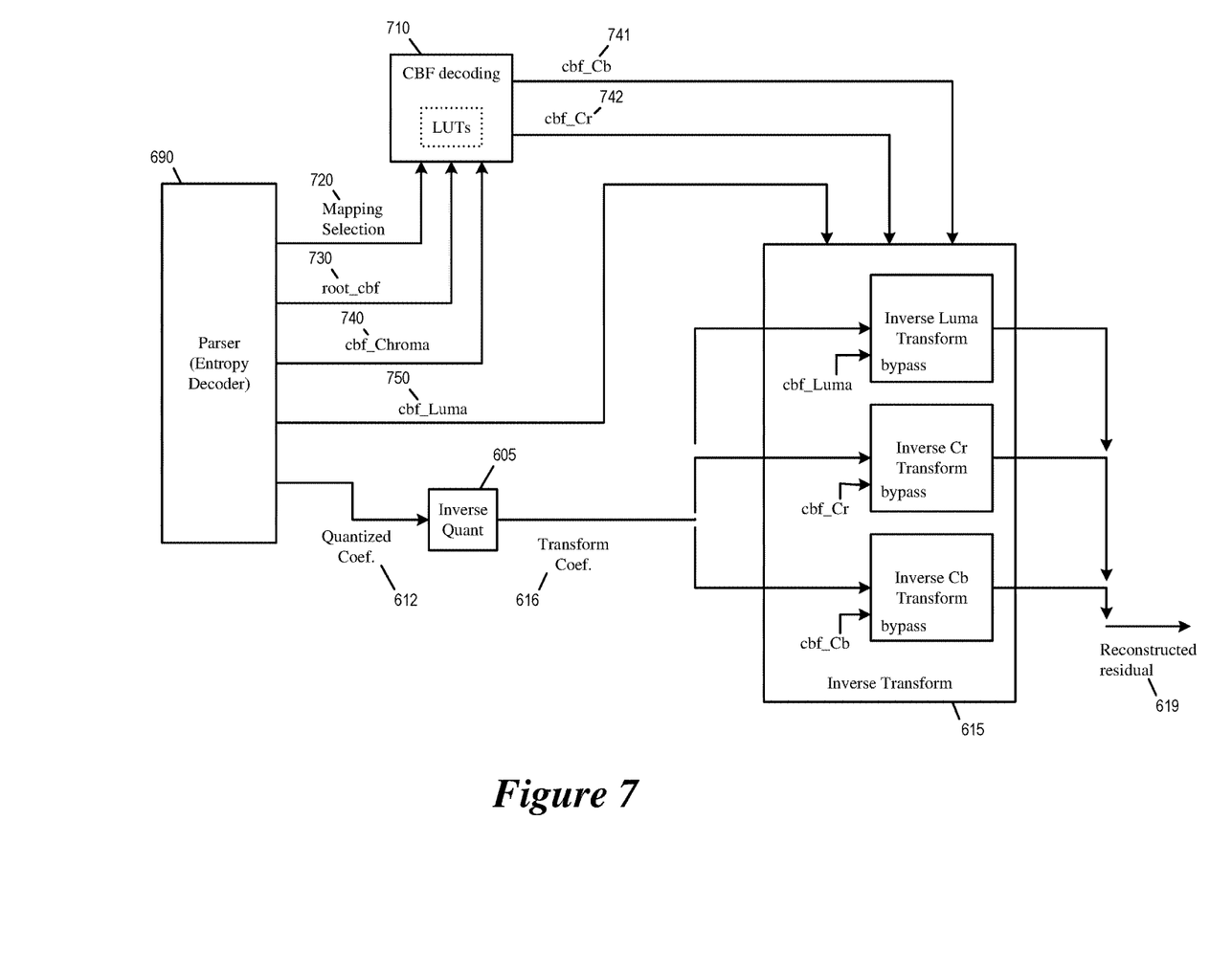
FIG. 7 illustrates portions of the video decoder that decodes and uses CBF syntax elements.

FIG. 7 illustrates portions of the video decoder 600 that decodes and uses CBF syntax elements. Specifically, the figure illustrates the portion of the video decoder 600 that determines CBF values of Cb transform blocks and Cr transform blocks by decoding a single syntax element, namely cbf_chroma. As illustrated, the parser 690 parses the bitstream 695 for encoded data of the current block of pixels. The parsed encoded data includes a mapping selection syntax element 720, a root_cbf syntax element 730, a cbf_chroma syntax element 740, a cbf_luma syntax element 750, and the quantized coefficients 612.

A CBF decoding module 710 receives the mapping selection syntax element 720, the root_cbf syntax element 730, and the cbf_chroma syntax element 740. The CBF decoding module 710 uses the mapping selection syntax element 720 to select one LUT from several LUTs (e.g., Table 2). The CBF decoding module 710 uses the selected LUT to map the cbf_chroma syntax element 740 into CBF flags for Cr component (cbf_cb 741) and Cr component (cbf_cr 742). In some embodiments, the CBF decoding module is part of the parser module 690. In some embodiments, the CBF decoding module 710 uses the cbf_chroma and root_cbf syntax elements to generate the cbf_cr and cbf_cb flags by performing the process 200 described by reference to FIG. 2 above.

The inverse transform module 615 uses the CBF flags to determine which of the luma or chroma components do not have non-zero transform coefficients. Specifically, the inverse transform module 615 uses cbf_luma 750 to decide whether to bypass inverse transform for luma component, cbf_cb 741 to decide whether to bypass inverse transform for Cb component, and cbf_cr 742 to decide whether to bypass inverse transform for Cr component. In some embodiments, the inverse transform module provides place holder or zero transform coefficients for bypassed components. The results of the inverse transform operations for the different components are the reconstructed residuals 619.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 8:
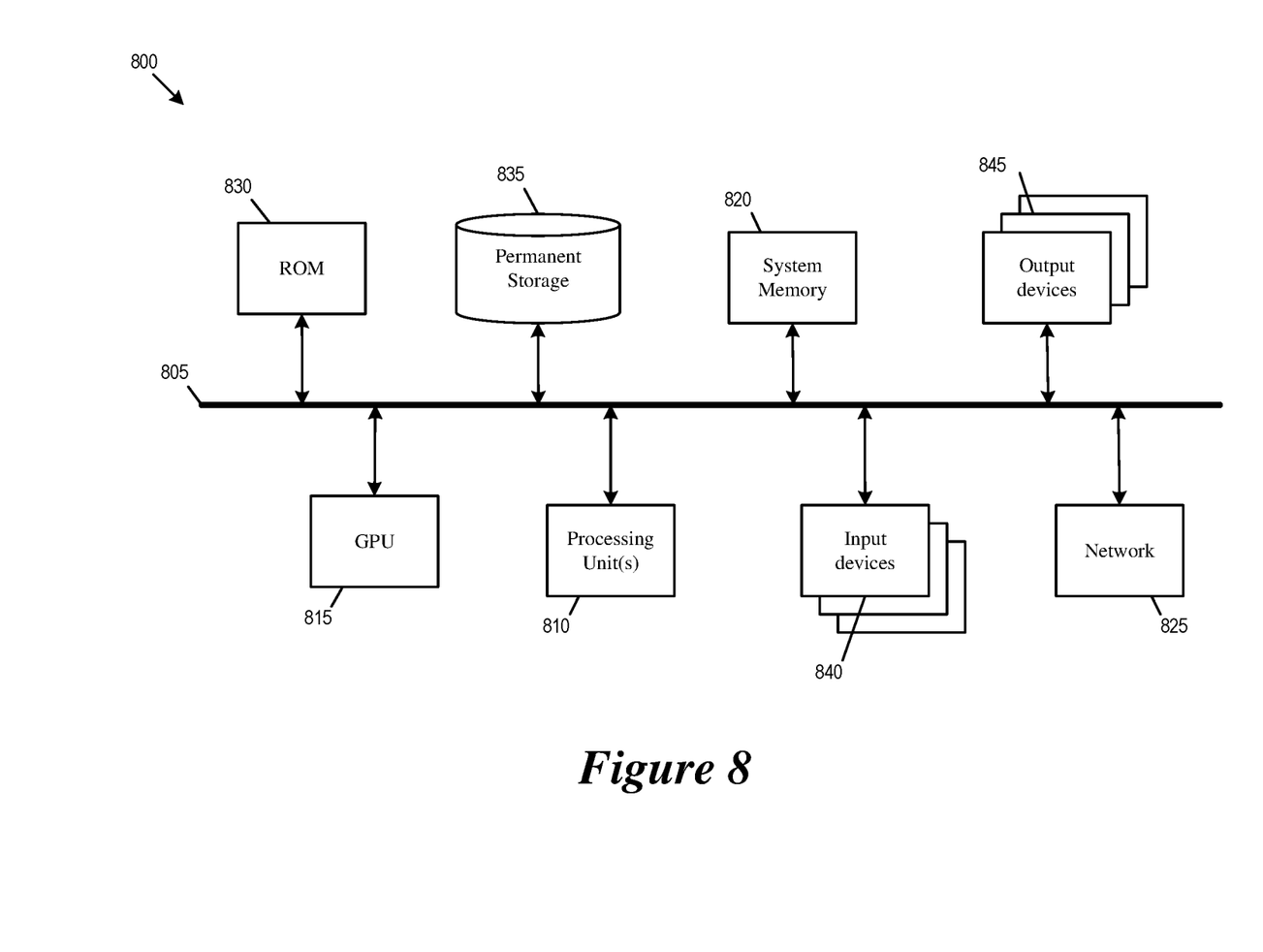
FIG. 8 conceptually illustrates an electronic system with which some embodiments of the present disclosure are implemented.

FIG. 8 conceptually illustrates an electronic system 800 with which some embodiments of the present disclosure are implemented. The electronic system 800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 800 includes a bus 805, processing unit(s) 810, a graphics-processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the GPU 815, the read-only memory 830, the system memory 820, and the permanent storage device 835.

From these various memory units, the processing unit(s) 810 retrieves instructions to execute and data to process in order to execute the processes of the present disclosure. The processing unit(s) may be a single processor or a multi-core processor in different embodiments. Some instructions are passed to and executed by the GPU 815. The GPU 815 can offload various computations or complement the image processing provided by the processing unit(s) 810.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the present disclosure use a mass-storage device (such as a magnetic or optical disk and its corresponding disk drive) as the permanent storage device 835.

Other embodiments use a removable storage device (such as a floppy disk, flash memory device, etc., and its corresponding disk drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor needs at runtime. In some embodiments, processes in accordance with the present disclosure are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 2 and 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
   receiving a block of pixels comprising a luma component, a first chroma component, and a second chroma component, wherein the block of pixels are encoded as transform coefficients;
   coding first and second flags as a single code word which is a truncated unary code to jointly signal values of the first and second flags, wherein the first flag indicates a presence of a non-zero transform coefficient for the first chroma component and the second flag indicates a presence of a non-zero transform coefficient for the second chroma component, and wherein the code word has different lengths ranging from one bit to three bits for different combinations of the values of the first and second flags; and
   coding the block of pixels for transmission or display by using the first and second flags.

2. The method of claim 1, wherein the first flag is a one-bit value and the second flag is a one-bit value, and wherein a shortest length for the code word has no more than one bit.

3. The method of claim 1, wherein a value of the code word is 0 when a length of the code word is one bit.

4. The method of claim 1, wherein a shortest length for the code word represents absence of any non-zero transform coefficients for both the first and second chroma components.

5. The method of claim 4, wherein a second shortest length for the code word represents presence of non-zero transform coefficients for both the first and second chroma components.

6. The method of claim 4, wherein the first chroma component is chroma-blue (Cb) and the second chroma component is chroma-red (Cr), and wherein the second shortest length for the code word represents presence of at least one non-zero transform coefficient for the first chroma component and absence of any non-zero transform coefficients for the second chroma component.

7. The method of claim 1, further comprising coding a root coded block flag for indicating a presence of a non-zero transform coefficient for the block of pixels, wherein when the root coded block flag for the block of pixels is zero, the first flag and the second flag are inferred to be zero and the code word is not encoded.

8. The method of claim 1, wherein the different lengths of the code word are mapped to different combinations of values of the first and second flags according to a look up table (LUT), and wherein the LUT is selected from among a plurality of LUTs based on a selection value that is encoded as part of a sequence parameter set (SPS), a picture parameter set (PPS), or a slice segment header of a bitstream that encodes the block of pixels.

9. The method of claim 1, further comprising coding a third flag that indicates a presence of a non-zero transform coefficient for the luma component, wherein coding the block of pixels for transmission or display is further based on the third flag.

10. An electronic apparatus comprising:
    a video decoder circuit capable of:
      receiving a block of pixels comprising a luma component, a first chroma component, and a second chroma component, wherein the block of pixels are encoded as transform coefficients;
      decoding a single code word which is a truncated unary code that jointly signals values of first and second flags to obtain the first and second flags, wherein the first flag indicates a presence of a non-zero transform coefficient for the first chroma component and the second flag indicates a presence of a non-zero transform coefficient for the second chroma component, wherein the code word has different lengths ranging from one bit to three bits for different combinations of the values of the first and second flags;
      decoding the block of pixels based on the first and second flags to identify components of the block of pixels having a non-zero transform coefficient; and
      outputting the decoded block of pixels for display.

11. An electronic apparatus comprising:
    a video encoder circuit capable of:
      receiving a block of pixels comprising a luma component, a first chroma component, and a second chroma component;
      encoding the block of pixels as transform coefficients;
      encoding first and second flags as a single code word which is a truncated unary code to jointly signal values of the first and second flags, wherein the first flag indicates a presence of a non-zero transform coefficient for the first chroma component and the second flag indicates a presence of a non-zero transform coefficient for the second chroma component, wherein the code word has different lengths ranging from one bit to three bits for different combinations of the values of the first and second flags; and storing the encoded code word and the encoded transform coefficients in a bitstream.

12. The method of claim 1, wherein a single syntax element is used to jointly code coded block flag (CBF) values of a pair of collocated first transform block corresponding to the first chroma component and second transform block corresponding to the second chroma component from a transform unit.

13. The method of claim 12, wherein a plurality of combinations of the CBF values are identified by a variable, and wherein the variable is binarized as the syntax element based on the truncated unary code.

14. The method of claim 13, wherein a maximum code word value of the truncated unary code is 3.

15. The electronic apparatus of claim 10, wherein a single syntax element is used to jointly code coded block flag (CBF) values of a pair of collocated first transform block corresponding to the first chroma component and second transform block corresponding to the second chroma component from a transform unit.

16. The electronic apparatus of claim 15, wherein a plurality of combinations of the CBF values are identified by a variable, and wherein the variable is binarized as the syntax element based on the truncated unary code.

17. The electronic apparatus of claim 16, wherein a maximum code word value of the truncated unary code is 3.

18. The electronic apparatus of claim 11, wherein a single syntax element is used to jointly code coded block flag (CBF) values of a pair of collocated first transform block corresponding to the first chroma component and second transform block corresponding to the second chroma component from a transform unit.

19. The electronic apparatus of claim 18, wherein a plurality of combinations of the CBF values are identified by a variable, and wherein the variable is binarized as the syntax element based on the truncated unary code.

20. The electronic apparatus of claim 19, wherein a maximum code word value of the truncated unary code is 3.

* * * * *